O. P. HOLBROOK.
TILE DRAIN PROTECTOR.
APPLICATION FILED DEC. 27, 1909.
955,593.
Patented Apr. 19, 1910.
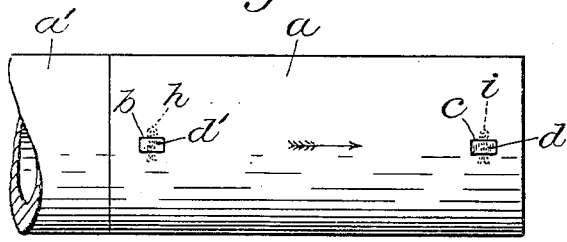
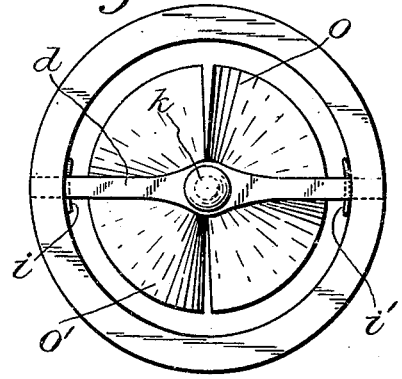
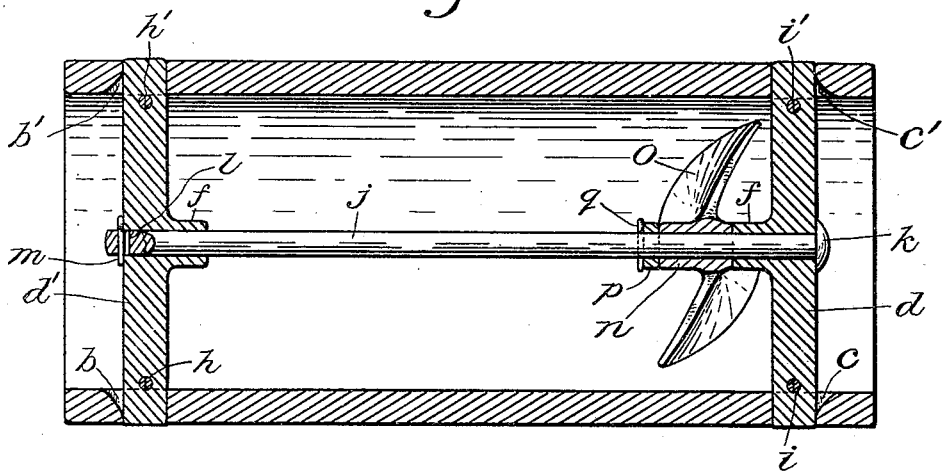
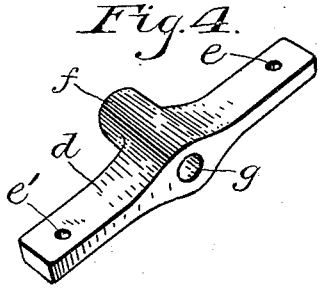
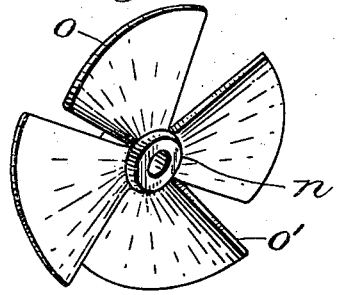
WITNESSES:
J. H. Gardner
K. R. Woddell
INVENTOR:
Otto P. Holbrook,
BY
E. T. Silvius,
ATTORNEY.

UNITED STATES PATENT OFFICE.

OTTO P. HOLBROOK, OF UNION TOWNSHIP, SHELBY COUNTY, INDIANA.

TILE-DRAIN PROTECTOR.

955,593.  Specification of Letters Patent.  Patented Apr. 19, 1910.

Application filed December 27, 1909. Serial No. 535,098.

*To all whom it may concern:*

Be it known that I, OTTO P. HOLBROOK, a citizen of the United States, residing in Union township, in the county of Shelby and State of Indiana, have invented certain new and useful Improvements in Tile-Drain Protectors; and I do declare the following to be a full, clear, and exact description of the invention, reference being had to the accompanying drawings, and to the letters of reference marked thereon, which form a part of this specification.

This invention relates to tile-drains commonly used in drainage of wet lands, the invention having reference particularly to a tile-drain section provided with means for preventing musk-rats and other small animals from entering the terminal ends of the drains and obstructing the flow of the water through the drains by means of debris, twigs, grass, or other substances which the animals might carry in for bedding or nests, the object of the invention being to cheaply and effectually prevent the disabling of tile-drains in the mentioned manner, the aim being to eliminate the expense of clearing the drain-pipes when they become inefficient for the drainage purposes.

With the above-mentioned object in view the invention consists in an improved drain-pipe having an animal obstruction therein adapted to be rotated by the outflowing drainage water and without materially obstructing the flow of the water, said device being adapted to keep silt or sedimentary matter in circulation to prevent obstructive accumulation thereof.

Referring to the drawings, Figure 1 is a fragmentary side elevation of a tile-drain, particularly the terminal end section thereof which is provided with the improved drain-protector; Fig. 2, an end elevation of the terminal section; Fig. 3, a horizontal longitudinal section of the terminal drain section; Fig. 4, a perspective view of one of the frame members whereby the device for preventing the passage of the animals is rotatively supported; and Fig. 5, a perspective view of the protector proper, or device for preventing the entrance of the animals into the drain-pipe.

Similar reference characters in the several figures of the drawings indicate corresponding elements or features of construction herein referred to.

The invention comprises a tubular tile drain section $a$ which may be composed of concrete or of clay tiling, and is adapted to be connected in the usual manner with ordinary tile drain sections $a'$ at the terminal end of the drainage line, the section $a$ having two apertures $b$ and $b'$ in opposite portions of the wall near one end thereof and two similar apertures $c$ and $c'$ in opposite portions of the wall near the opposite end thereof, all the apertures being in one horizontal plane. Two identical frame-members $d$ and $d'$ are inserted in the apertures, one member being in the apertures $b$ and $b'$ and the other one in the apertures $c$ and $c'$ and are therefore arranged horizontally, so as to not in any way obstruct the flow of water on the lower portion of the drain section. The frame-members are relatively thin in vertical direction and each member has two pin-holes $e$ and $e'$ therein near its ends, or so that the holes are located at the inner side of the wall of the drain section, said frame members preferably having each a projection $f$ on one side of the middle portion thereof, and a central hole $g$ extending through the projection, the members being secured in the apertures in which they are seated by means of pins or cotters $h$, $h'$, $i$, $i'$, the central holes $g$ receiving a shaft $j$ that extends through both of the frame-members $d$ and $d'$, the shaft having a head $k$ thereon seated against the outer side of one of the frame members, and the opposite end of the shaft having a key-way $l$ therein in which is a key or pin $m$ engaging the outer side of the other one of the frame-members.

The protector proper comprises a hub $n$ on which are a suitable number of blades $o$, $o'$ that are suitably twisted or set at oblique angles to the plane of motion of the water-wheel or rotary barrier composed of the hub and blades, the hub being rotatably mounted on the shaft $j$ preferably adjacent to one of the frame-members and running against a collar $p$ that is placed on the shaft, and the collar and the hub prevented from movement longitudinally of the shaft by a stop-pin $q$ with which the shaft is provided. It is preferred to arrange the water-wheel or rotary-barrier in the terminal end of the pipe section, so that the entrance of an animal into the section shall be effectually barred.

In practical use the water will flow through the drainage line in the direction of the arrow in Fig. 1 and when there is only a small stream the water will pass under the water-wheel, but when the water rises sufficiently in the drain, so as to come in contact with the blades of the wheel the force of the water will rotate the wheel and permit the water to pass between the blades, it being understood that the side edges of the blades are somewhat separated from the side edges of the adjacent blades, and in case that sand or silt is carried along with the water the motion of the wheel will agitate the sand, so that it will be carried out of the drain with the water.

Having thus described the invention, what is claimed as new, is—

1. A tubular drain pipe section having two frame members extending across the interior and into opposite portions of the wall thereof and secured thereto, a shaft supported by the frame members, and a hub supported rotatably by the shaft adjacent to one of the frame members and having oblique-angled blades thereon.

2. A tubular drain pipe section having a plurality of apertures in each of two opposite portions of the wall thereof, two frame members extending across the interior of the pipe section, the ends of each member extending into two of the apertures in opposite portions of the wall and secured therein, a shaft mounted in and supported by the two frame members, and a wheel rotatably mounted on the shaft and comprising blades that are oblique-angled to the plane of the wheel.

3. A tile drain protector comprising a pipe section having two apertures in opposite portions of the wall near one end thereof and two apertures in opposite portions of the wall near the opposite end thereof, the apertures being in one horizontal plane, two frame members having each a pin-hole in each end portion and also a central hole therein, one member extending into the apertures near one end of the section and the other member extending into the apertures near the other end of the section, a plurality of securing pins, one in each of said pin-holes against the inner side of the wall of the section, a shaft extending through the central holes of the frame members and secured therein, and a wheel-hub mounted rotatably on the shaft adjacent to the inner side of one of the frame members and having oblique-angled blades thereon.

In testimony whereof, I affix my signature in presence of two witnesses.

OTTO P. HOLBROOK.

Witnesses:
  Geo. H. Meiks,
  Herbert C. Jones.